(12) United States Patent
Dong

(10) Patent No.: US 9,576,381 B2
(45) Date of Patent: Feb. 21, 2017

(54) METHOD AND DEVICE FOR SIMPLIFYING SPACE DATA

(75) Inventor: Futian Dong, Jiangsu (CN)

(73) Assignee: SUZHOU XINTU GEOGRAPHIC INFORMATION TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 13/520,686

(22) PCT Filed: Dec. 31, 2010

(86) PCT No.: PCT/CN2010/080580
§ 371 (c)(1),
(2), (4) Date: Jul. 5, 2012

(87) PCT Pub. No.: WO2011/082648
PCT Pub. Date: Jul. 14, 2011

(65) Prior Publication Data
US 2012/0275723 A1    Nov. 1, 2012

(30) Foreign Application Priority Data

Jan. 7, 2010   (CN) .......................... 2010 1 0017270
Mar. 21, 2010  (CN) .......................... 2010 1 0144114

(51) Int. Cl.
G06K 9/32    (2006.01)
G06T 11/20   (2006.01)
G06T 9/20    (2006.01)

(52) U.S. Cl.
CPC .............. *G06T 11/203* (2013.01); *G06T 9/20* (2013.01)

(58) Field of Classification Search
CPC ....... G06F 3/04815; G06T 17/00; G06T 17/05
See application file for complete search history.

(56) References Cited

U.S. PATENT DOCUMENTS 5,798,923 A * 8/1998 Laskowski .................. 702/5
6,434,277 B1 * 8/2002 Yamada et al. ............. 382/285
(Continued)

FOREIGN PATENT DOCUMENTS

CN    101483779 A    7/2009
CN    101561819 A    10/2009
(Continued)

OTHER PUBLICATIONS

Shahriari et al., "Minimising Positional Errors in Line Simplification Using Adaptive Tolerance Values", 2002, 10th International Symposium on Spatial Data Handling, pp. 153-166.*
(Continued)

*Primary Examiner* — Vu Le
*Assistant Examiner* — Guillermo Rivera-Martinez
(74) *Attorney, Agent, or Firm* — Cantor Colburn LLP

(57) ABSTRACT

A method and a device for simplifying space data are provided, and the method includes: an original coordinate point of original space data is transformed into a view coordinate point of a view window according to predetermined view control parameters; the view coordinate point is analyzed that whether it accords with a simplification condition; the original coordinate point corresponding to the view coordinate point that accords with the simplification is simplified according to an analysis result. The method for simplifying space data transforms the original coordinate point of original space data into the view coordinate point of the view window and performs analysis processing, which can ensure that not only the space relation of each simplified space data of random complex itself is displayed correctly, but also the space relations between all the simplified space data are displayed correctly.

9 Claims, 4 Drawing Sheets

(56) References Cited

U.S. PATENT DOCUMENTS

| | | | |
|---|---|---|---|
| 6,980,690 B1* | 12/2005 | Taylor et al. | 382/154 |
| 7,430,340 B2* | 9/2008 | Glass et al. | 382/293 |
| 7,872,647 B2* | 1/2011 | Mayer et al. | 345/420 |
| 2003/0231190 A1* | 12/2003 | Jawerth et al. | 345/660 |
| 2005/0063596 A1* | 3/2005 | Yomdin et al. | 382/232 |
| 2006/0234689 A1 | 10/2006 | Debruin et al. | |
| 2007/0139411 A1* | 6/2007 | Jawerth et al. | 345/440 |
| 2007/0229510 A1* | 10/2007 | Rey | 345/443 |

FOREIGN PATENT DOCUMENTS

| | | | | |
|---|---|---|---|---|
| CN | 101814197 A | | 8/2010 | |
| CN | 101819590 A | | 9/2010 | |
| CN | 101827097 A | * | 9/2010 | |
| CN | 102096945 A | * | 6/2011 | G06T 1/00 |

OTHER PUBLICATIONS

Shin-Ting et al., "The Douglas-Peucker Algorithm: Sufficiency Conditions for Non-Self-Intersections", Dec. 2006, Universidade Estadual de Campinas (UNICAMP), Faculdade de Engenharia Elétrica e Computação (FEEC), pp. 1-17.*

Yun et al., "A New Lossless Compression Algorithm for Vector Maps", Dec. 2008, 2008 International Symposium on Computer Science and Computational Technology, pp. 347-351.*

Shin et al., Jun. 2009, "Multi-scaled line simplification of the digital maps and quantifying the comparative results: case study with USGS DLG hydrology data in the US Buffalo Region", Journal of Korea [KCI listed] Article 9 (1), Korea Institute of map, pp. 27-37.*

International Search Report for International application No. PCT/CN2010/080580 mailing date of Mar. 31, 2011 with English translation.

* cited by examiner

METHOD AND DEVICE FOR SIMPLIFYING SPACE DATA

CROSS REFERENCE TO RELATED APPLICATIONS

This is a U.S. national stage of application No. PCT/CN2010/080580, filed on 31Dec. 2010. Priority under 35 U.S.C. §119(a) and 35 U.S.C. §365(b) is claimed from Chinese Application No. 201010017270.5, filed 7 Jan. 2010, and Chinese Application No. 201010144114.5, filed 21 Mar. 2010, the disclosure of which are also incorporated herein by references.

This application claims the priority of Chinese Patent Application No. 201010017270.5, entitled "SELF-ADAPTIVE SIMPLIFICATION METHOD FOR VECTOR DATA BASED ON SPATIAL ENTITY VIEW MODEL", filed with the Chinese Patent Office on Jan. 7, 2010 and Chinese Patent Application No. 201010144114.5, entitled "SELF-ADAPTIVE SIMPLIFICATION METHOD FOR VECTOR DATA BASED ON SPATIAL ENTITY VIEW MODEL", filed with the Chinese Patent Office on Mar. 21, 2010, both of which are incorporated by reference in their entirety herein.

FIELD OF THE INVENTION

The present invention relates to the fields of spatial information technology, computer graphics and computer operating system, and in particular to a method and device for simplifying spatial data.

BACKGROUND OF THE INVENTION

A spatial entity is abstraction for an entity or phenomenon that exists or is virtualized in the natural world, correlates with a spatial position or feature, and is the minimum unit that can not be divided in the natural world. There are four types of basic spatial entities, i.e., point, line, surface and space. Spatial data is used for representing the spatial position, form information and spatial relation of the spatial entity itself, such as the information of the topology relation. The spatial data structure of the spatial data includes a vector data structure and a raster data structure. The vector data structure describes a spatial entity by a spatial discrete point coordinate, and views the entire studied space as a spatial domain, and the spatial entity is distributed in this spatial domain as an independent object. The raster data structure divides the space into uniform grids to describe a spatial entity with the characteristic of continuous distribution in a specific space.

With rapid development of spatial information technology, the obtained spatial data with high resolution and high accuracy increases explosively, however it gives rise to a series of problems, of which the most significant one is the real-time rapid transmission and display of the vector data in the massive spatial data of a high resolution map, one of the key methods for solving this problem is to simply the vector data before being transmitted and displayed. Typically, the existing method for simplifying vector data is Douglas-Peucker method, the basic idea of which is: connecting the head point and the end point of a curve virtually, then calculating the distance from all the points to this straight line and finding the maximum distance value dmax, and comparing the dmax with a tolerance D, discarding all the middle points on this curve if dmax<D; and remaining the coordinate point corresponding to the dmax, dividing the curve into two parts by taking this point as boundary, and applying this method to those two parts, if dmax≥D. This method has the following disadvantages: 1. the distance valve D is generally selected experientially based on the complexity of the vector data judged artificially, thus the threshold of the distance based on the human experience determines the number of the remained point after the vector data is simplified; 2. the most significant default of this method is that the spatial relation between the vector data is not considered, and it can not be ensured that all spatial relations between the simplified vector data are displayed correctly; 3. the lossless display simplification can not be performed according to the amplification ratio of the vector which is displayed on the client, i.e., the self-adaptive simplification can not be performed; and 4. the amount of the calculation is huge, the efficiency is low, and it is difficult to simplify massive vector data in real time.

SUMMARY OF THE INVENTION

In view of this, the present invention provides a method and device for simplifying spatial data, and the specific solutions are as follows.

A method for simplifying spatial data, including:
transforming an original coordinate of original spatial data into a view coordinate in a view window according to a preset view control parameter, an original coordinate point of the original spatial data being corresponding to a view coordinate point in a coordinate system of the view window;
analyzing whether the view coordinate point conforms to a simplification condition in the view window; and
simplifying the original coordinate point corresponding to the view coordinate point that conforms to the simplification condition, according to the result of analyzing.

Preferably, the view window is represented using a data structure according to the view control parameter, which particularly comprises: representing a pixel of the view window using a raster data structure according to the view control parameter, and wherein the pixel is a uniform grid unit into which the plane of the view window is divided, the pixel is a basic information storage unit in the raster data, a coordinate of the pixel is determined according to a corresponding line number and column number of the pixel in the view window, and the initial value of each raster data representing the pixel is set as 0.

Preferably, the analyzing whether the view coordinate point conforms to a simplification condition includes:
analyzing a view coordinate point of which the abscissa is equal to the ordinate among the view coordinate points, and judging whether the analyzed view coordinate point conforms to a simplification condition.

Preferably, the analyzing whether the view coordinate point conforms to a simplification condition includes:
analyzing view coordinate points corresponding to a pixel in the view window among the view coordinate points, and judging whether the analyzed view coordinate points conform to a simplification condition.

Preferably, the judging whether the view coordinate point conforms to a simplification condition includes:
reading the value of the pixel corresponding to the view coordinate point in the view window; and
judging whether the value of the pixel is 1, the view coordinate point does not conform to the simplification condition in the case that the pixel value is 0, judging whether the view coordinate point is equal to a view coordinate point corresponding to an original coordinate point that is previous to the original coordinate point in the case that the pixel value is 1, the view coordinate point conforms to the simplification condition if the view coordinate point is equal to the view coordinate point corresponding to the original coordinate point that is previous to the original coordinate point, else the view coordinate point does not conform to the simplification condition.

Preferably, the analyzing whether the view coordinate point conform to a simplification condition includes:

reading the value of the pixel corresponding to the view coordinate point in the view window; and judging whether the value of the pixel is 1, the view coordinate point does not conform to the simplification condition in the case that the pixel value is 0; judging whether the original coordinate point corresponding to the view coordinate point is the last original coordinate point of the original spatial data in the case that the pixel value is 1; judging whether the original coordinate point corresponding to the view coordinate point is equal to the first original coordinate point of the original spatial data if the original coordinate point corresponding to the view coordinate point is the last original coordinate point of the original spatial data, the view coordinate point does not conform to the simplification condition if the original coordinate point corresponding to the view coordinate point is equal to the first original coordinate point of the original spatial data; judging whether the view coordinate point is equal to a view coordinate point corresponding to an original view coordinate point that is previous to the original coordinate point if the original coordinate point corresponding to the view coordinate point is not the last original coordinate point of the original spatial data or is not equal to the first original coordinate point of the original spatial data, the view coordinate point conforms to the simplification condition if the view coordinate point is equal to the view coordinate point corresponding to the original coordinate point that is previous to the original coordinate point, and the view coordinate point does not conform to the simplification condition if the view coordinate point is not equal to the view coordinate point corresponding to the original coordinate point that is previous to the original coordinate point.

Preferably, the method further includes:

judging whether the original coordinate point corresponding to the view coordinate point is the last original coordinate point, selecting a next original coordinate point and returning to the step of transforming an original coordinate of original spatial data into a view coordinate in a view window according to a preset view control parameter if not, and else ending the process.

Preferably, the method further includes:

assigning 1 to the pixel, when the view coordinate point does not conform to the simplification condition and the value of the pixel corresponding to the view coordinate point is 0.

Preferably, the view control parameter includes a view mode and a parameter of the bounding rectangle of the view window; wherein the view mode includes a two-dimensional mode and a three-dimensional mode, and the parameter of bounding rectangle of the view window includes the width of the bounding rectangle of the view window and the height of the bounding rectangle of the view window; and in the case of the two-dimensional mode, the view control parameter further includes a rectangular range of a queried spatial entity and an amplification ratio of the spatial entity displayed in the view window;

in the case of the three-dimensional mode, the view control parameter further includes a viewpoint parameter and a projection parameter; the viewpoint parameter includes a position of the viewpoint in the world coordinate system, a position of an object viewed by the viewpoint and a upward vector of a virtual camera, and the projection parameter includes an orthogonal projection and a perspective projection.

Preferably, the amplification ratio of the spatial entity is determined by the following steps:

acquiring the ratio between the width of the bounding rectangle of the view window and the width of the rectangular range of the queried spatial entity in the view control parameter and the ratio between the height of the bounding rectangle of the view window and the height of the rectangular range of the queried spatial entity in the view control parameter; and determining the smaller one of the two ratios as the amplification ratio of the spatial entity displayed in the view window.

A device for simplifying spatial data, including:

a coordinate transforming unit for transforming an original coordinate of original spatial data into a view coordinate in a view window according to a preset view control parameter, an original coordinate point of the original spatial data being corresponding to a view coordinate point in a coordinate system of the view window;

an analyzing unit for analyzing whether the view coordinate point conforms to a simplification condition in the view window; and a simplifying unit for simplifying the original coordinate point corresponding to the view coordinate point that conforms to the simplification condition, according to the result of analyzing.

It can be seen from the above technical solutions that in the method for simplifying spatial data disclosed by the embodiments of the present invention, the original coordinate point of the original spatial data is transformed into the view coordinate point that is represented using the data structure according to the view control parameter in the view window, analyzes or processes the pixel corresponding to the view coordinate point in the view window, so as to analyze the display of the spatial entity in the actual view window, and performs the analysis and simplification based on the result of analyzing, ensuring that the lossless display can be performed for the simplified spatial data in the actual display window and the spatial relation between the simplified spatial data is displayed correctly.

BRIEF DESCRIPTION OF THE DRAWINGS

In order to illustrate the technical solutions in the embodiment of the present invention or in the prior art more clearly, drawings to be used in the description of the prior art or the embodiment will be described briefly hereinafter. Apparently, the drawings described hereinafter are only some embodiments of the present invention, and other drawings can be obtained by those skilled in the art according to those drawings without creative work.

DETAILED DESCRIPTION OF THE INVENTION

The technical solution in the embodiment of the present invention will be described clearly and completely hereinafter in conjunction with the drawings in the embodiment of the present invention. Obviously, the described embodiments are only some of the embodiments of the present invention, but not all the embodiments. All the other embodiments obtained by those skilled in the art without creative work, based on the embodiment in the present invention, fall within the scope of protection of the present invention.

For convenient description, in this application, the spatial data to be processed is referred to the original spatial data, the coordinate of the spatial data to be processed is referred to the original coordinate of the original spatial data, and the coordinate point of the spatial data to be processed is referred to the original coordinate point of the original spatial data, or referred to the original coordinate point directly.

The present invention discloses a method for simplifying spatial data. During the simplification of the spatial data, the corresponding actual scene is: because the resolution of the view window is limited, the data (coordinate points) representing the detail of the spatial data will display on the same pixel when the spatial data with high resolution is displayed in the view window. In this case, the lossless display of the vector data will be ensured, as long as one coordinate point displayed on this pixel is read and the other coordinate points displayed on this pixel point and meeting the simplification condition can be removed. Therefore according to the above idea, the original coordinate of the original spatial data is transformed into the view coordinate in the view window, the original coordinate point of the original spatial data corresponds to the view coordinate point in the coordinate system of the view window, the view coordinate points corresponding to the same pixel in the view window are analyzed among the view coordinate points, the original spatial data corresponding to the view coordinate point that conforms to the simplification condition is simplified, the simplified spatial data is displayed and transmitted, so that not only the lossless display of the spatial data and the self-adaptive simplification but also the correct display of the spatial relation between the spatial data is ensured. Because the display effects before and after simplifying are the same, and the transmission efficiency and displaying efficiency of the spatial data are further improved. There are many problems with simplifying the vector data by the existing method for simplifying spatial data, therefore in the embodiment of the present invention, the description aims mainly at the vector data, and the specific implementations are as follows.

Figure 1:
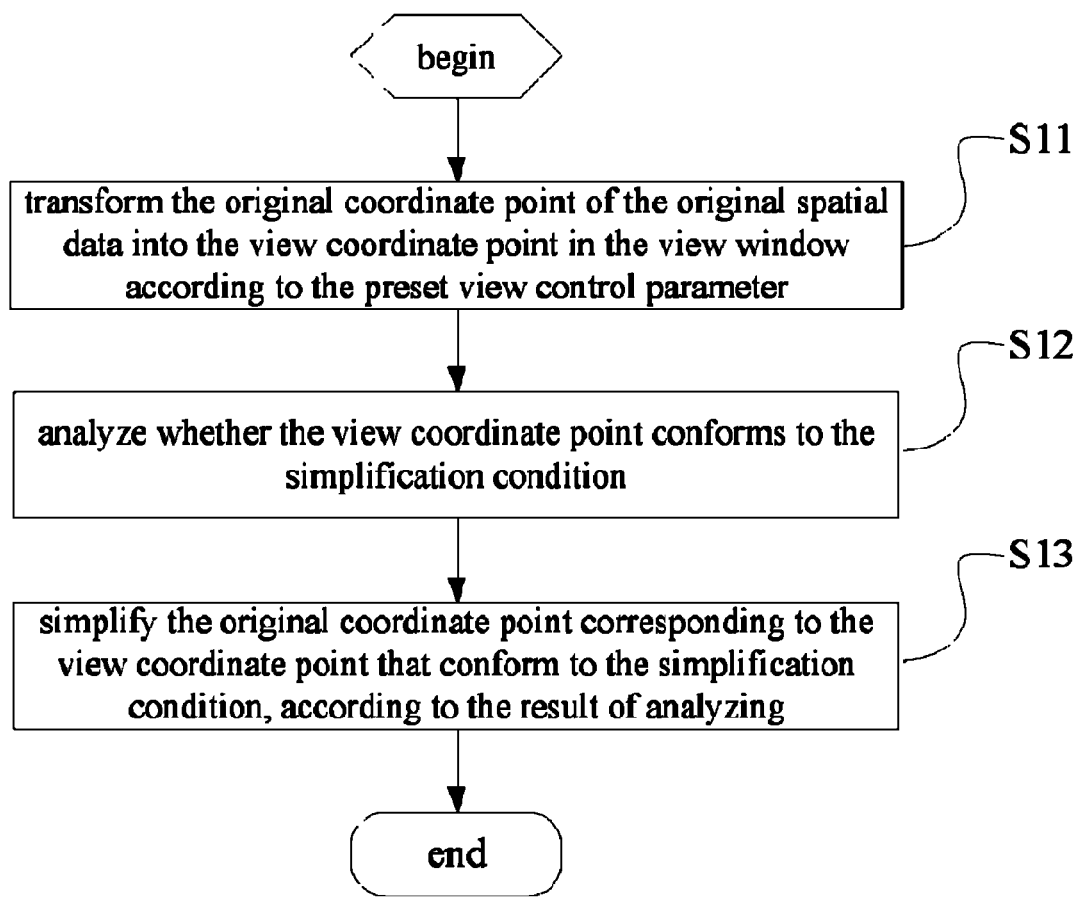
FIG. 1 is a flow chart of a method for simplifying spatial data disclosed by an embodiment of the present invention.

The flow chart of a method for simplifying spatial data disclosed by the present invention is shown in FIG. 1, and the method includes the following steps.

Step S11: Transforming an original coordinate of original spatial data into a view coordinate in a view window according to a preset view control parameter, an original coordinate point of the original spatial data being corresponding to a view coordinate point in a coordinate system of the view window.

In this step, the original coordinate point of the original spatial data is transformed into the view coordinate point in the view window that is represented using the data structure according to the view control parameter, so as to analyze or process the pixel in the view window corresponding to the view coordinate point and further analyze the display of the original spatial data in the actual view window, and simplify the original spatial data based on the result of analyzing, ensuring that the lossless display can be performed for the simplified spatial data in the actual display window and the spatial relation between the simplified spatial data is displayed correctly.

The preset view control parameter includes a view mode and a parameter of the bounding rectangle of the view window, the view mode includes a two-dimensional mode and a three-dimensional mode, and the parameter of the bounding rectangle of the view window includes the width of the bounding rectangle of the view window and the height of the bounding rectangle of the view window.

For the two-dimensional view mode, the view control parameter further includes the central coordinate point of the spatial entity in the view window and the amplification ratio of the spatial entity in the view, or the rectangular range of the queried spatial entity and the amplification ratio of the spatial entity in the view. The central coordinate point of the spatial entity in the view window and the rectangular range of the queried spatial entity both can be used to display the corresponding spatial entity in the view window.

The rectangular range of the queried spatial entity refers to a range, the spatial entities in which is displayed in the view window, i.e., the bounding rectangle of the spatial entity that can be displayed in the view window, and the range thereof is determined by the practical display condition.

The amplification ratio of the spatial entity in the view indicates the size of the spatial entity displayed in the view window, for example, if the spatial entity within the rectangular range of the given queried spatial entity is exactly full-screen displayed in the view window, then the calculation method of the amplification ratio of the spatial entity is: acquiring the ratio between the width of the bounding rectangle of the view window and the width of the rectangular range of the queried spatial entity in the view control parameter, and the ratio between the height of the bounding rectangle of the view window and the height of the rectangular range of the queried spatial entity in the view control parameter; and determining the smaller one of the two ratios as the amplification ratio of the spatial entity displayed in the view window.

To ensure that the displaying effects of the vector data before and after simplifying are the same, the amplification ratio for displaying the spatial in the view window among the view control parameter will be assigned with the amplification ratio of the spatial entity displayed in the actual view window. In addition, a compression ratio of the data, i.e., the value obtained by dividing the number of the simplified view coordinate points by the total number of the view coordinate points, can also be controlled by adjusting the amplification ratio of the spatial entity. The smaller the amplification ratio of the spatial entity, the larger the compression ratio of the data. However, more coordinate points representing the image detail will be simplified when larger compression ratio is obtained.

For the three-dimensional view mode, the view control parameter further includes a viewpoint parameter and a projection parameter, the viewpoint parameter includes a position of the view point in the world coordinate system, a position of an object viewed by the view point and a upward vector of a virtual camera; and the projection parameter includes an orthogonal projection and a perspective projection, or a view matrix and a projection matrix obtained according to the above parameters.

After the view control parameter is determined, the view window is represented using the data structure according to the view control parameter. The view window to be represented here can be a physical view window that can practically be used for displaying, and can also be a logical view window circumstance that is generated for analyzing.

When the view window is represented using the raster data structure, the raster image is represented by the raster data. The plane of the view window for displaying is divided into uniform grids, each of the grid units is referred to a pixel, the raster data structure is a pixel array, each pixel in the raster is a basic information storage unit in the raster data, and the coordinate position thereof can be determined by a line number and a column number. Because the raster data is arranged according to a specific rule, the position relation between the represented spatial entities is impliedly presented by the line number and the column number. Each pixel value is used to represent the attribute of the spatial entity and the code of the attribute.

The size of the raster data for representing the view window can be obtained by the parameter of the bounding rectangle of the view window in the view control parameter. For example, if the value of a pixel is represented in m bytes, the size of the raster data for representing the view window is (ViewWidth*ViewHeight*m). In addition, the initial value of the raster data for representing the view window is set as 0.

The received original coordinate of original spatial data is transformed into the view coordinate in the coordinate system of the view window according to the preset view control parameter, the original coordinate point of the original spatial data corresponds to the view coordinate point in the coordinate system of the view window, and each view coordinate point corresponds to the pixel of the view window represented by the raster data according to the view control parameter, analyzing whether this original spatial data needs to be simplified by analyzing the pixel to be operated when the original coordinate point of the original spatial data is displayed in the view window.

Step S12: Analyzing whether the view coordinate point conforms to a simplification condition.

It is judged whether the view coordinate point conforms to the simplification condition by analyzing the transformed view coordinate point in the view window. This step includes the following processes: analyzing view coordinate points of which the abscissa and the ordinate are equal among the view coordinate points, and judging whether the analyzed view coordinate point conform to the simplification condition, or analyzing view coordinate points corresponding to the same pixel in the view window among the view coordinate points, and judging whether the analyzed view coordinate point conforms to the simplification condition.

Step S13: Simplifying the original coordinate point corresponding to the view coordinate point that conforms to the simplification condition, according to the result of analyzing.

In the method for simplifying spatial data disclosed by this embodiment, the original coordinate point of the original spatial data is transformed into the view coordinate point in the view window that is represented using the data structure according to the view control parameter, and analyzes or processes the pixel in the view window corresponding to the view coordinate point, so as to analyze the display of the spatial entity in the actual view window, and performs the analysis and simplification based on the result of analyzing, ensuring that the lossless display can be performed for the simplified spatial data in the actual display window and the spatial relation between the simplified spatial data is displayed correctly.

Figure 2:
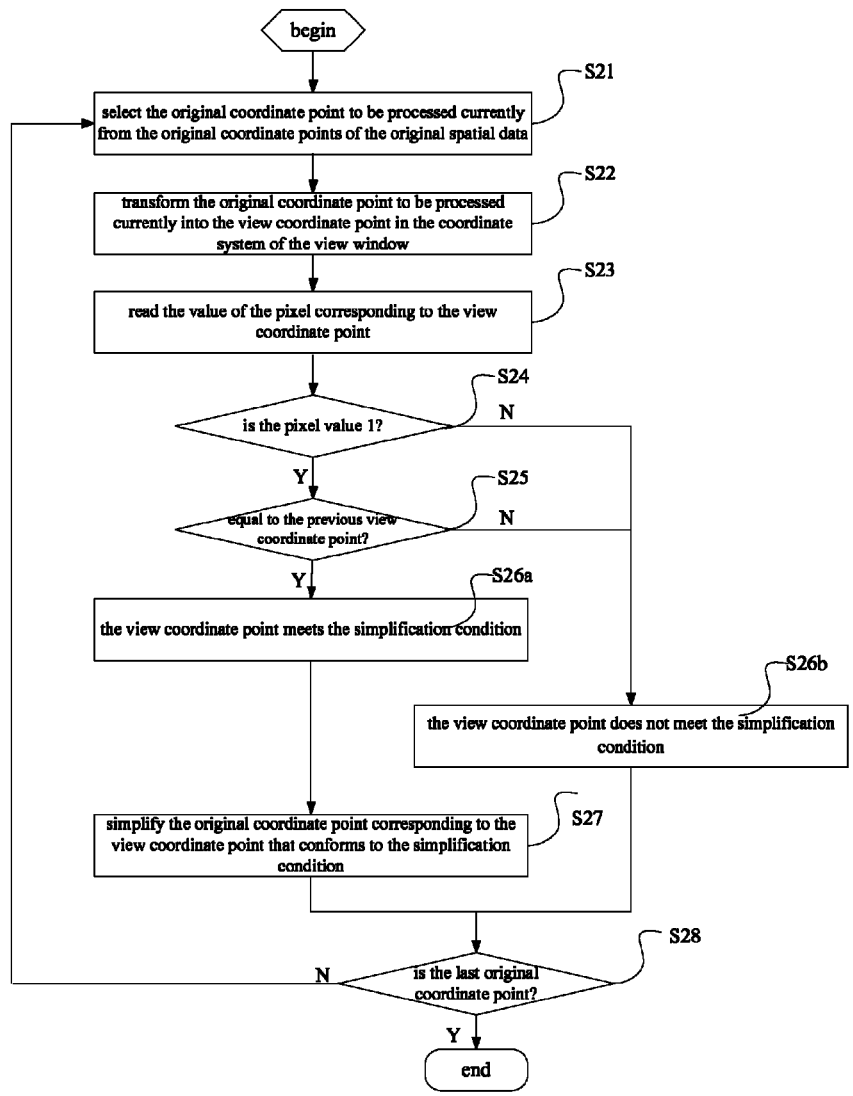
FIG. 2 is a flow chart of another method for simplifying spatial data disclosed by an embodiment of the present invention.

The flow chart of another method for simplifying spatial data disclosed by the present invention is shown in FIG. 2, and the method includes the following steps.

Step S21: Selecting the original coordinate point to be processed currently from the original coordinate points of the original spatial data.

Step S22: Transforming the original coordinate point to be processed currently into the view coordinate point in the coordinate system of the view window.

Step S23: Reading the value of the pixel corresponding to the view coordinate point.

Step S24: Judging whether the pixel value is 1, performing a step S25 if the pixel value is 1; else performing a step S26b.

This coordinate point does not conform to the simplification condition and needs to be remained if the pixel value is 0, and this coordinate point can be simplified after being further judged if the pixel value is 1.

Step S25: Judging whether the view coordinate point is the view coordinate point corresponding to the original coordinate point previous to the original coordinate point to be processed currently, performing a step S26a if yes; else performing a step S26b.

It is judged whether the original coordinate point to be processed currently is the view coordinate point transformed from the original coordinate point that is previous to the original coordinate point to be processed currently. If yes, two points are plotted on the same pixel in the view window for actually displaying and no other pixel will be plotted between the two coordinate points, thus one of the two points can be simplified and the display effect of the data will not be affected. If not, the original coordinate point to be processed currently can not be simplified, because other pixel will be plotted between the original coordinate point to be processed currently and other original coordinate point of the pixel in the view window corresponding to the original coordinate point to be processed currently when the spatial data is displayed is simplified, the spatial relation will not be displayed correctly when the spatial data of the original coordinate point to be processed currently is displayed in the view window if performing the simplification.

Step S26a: the view coordinate point conforms to the simplification condition.

Step S26b: the view coordinate point does not conform to the simplification condition.

In the case that the view coordinate point does not conform to the simplification condition and the value of the pixel corresponding to the view coordinate point is 0, 1 is assigned to the value of the pixel value to indicate that there is the view coordinate point corresponding to the pixel that does not conform to the simplification condition and this view coordinate point is remained, so as to identify the original spatial data corresponding to the original coordinate point to be processed currently as the remained data.

Step S27: simplifying the original coordinate point corresponding to the view coordinate point that conforms to the simplification condition, according to the result of analyzing.

The original coordinate point corresponding to the view coordinate point that conforms to the simplification condition, i.e., the original spatial data represented by the original coordinate point to be processed currently is simplified.

After the step S27 and the step S26b, the method further includes:

Step S28: Judging whether the original coordinate point to be processed currently is the last original coordinate point of the original spatial data, ending the process if yes, else returning to the step S21.

By the above cycle steps, after the coordinate transformation, all the view coordinate points in the original spatial data are successively analyzed, until all the original coordinate point of the original spatial data are analyzed. Those steps can also be applied in the above flow chart shown in FIG. 1.

In this embodiment, corresponding analyzing or processing is performed on the pixel to be operated when the view coordinate point is displayed in the view window, and the specific processes specifically include: reading the pixel value of the pixel to be operated, judging the pixel value and assigning a value to the pixel to be drawn. The above operation can be performed on individual pixel or on the combination of multiple pixels, and the specific processing manner can be set flexibly as needed in practice. The specific operation on the pixel includes assigning a value to the pixel, i.e., rasterizing the spatial data, reading the pixel value and judging the pixel value. when the pixel is indicated by multiple-bit data, the assigning a value to the pixel can be implemented by assigning to one pixel as a whole or assigning any one or more bits in the multiple-bit data representing the pixel; the reading the pixel value can be implemented by reading one pixel value as a whole or reading the value of a certain or several bits in the pixel; and similarly, the judging the pixel value can be implemented by judging the meaning represented by one pixel value as a whole or judging the meaning represented by the value of a certain or several bits.

For example, one pixel in the view window is represented by the 4-bit data, in which the first bit represents whether there is a point spatial entity to be rasterized on this pixel, the second bit represents whether there is a line spatial entity to be rasterized on this pixel, the third bit represents whether there is a surface spatial entity to be rasterized on this pixel, and the fourth bit is used for simplifying the spatial vector data. Firstly, several constants are defined:

| | |
|---|---|
| #define point | 0x0001 |
| #define line | 0x0002 |
| #define region | 0x0004 |
| #define simple | 0x0008 |

For example, the operations on the pixel corresponding to the line spatial entity are as follows.

The assignment operation of the pixel: the pixel is assigned by the OR operation of the defined constant line and the pixel value, so as to realize the rasterizing of the original spatial data. For example, a line rasterizing operation is performed on the P(x, y) pixel, P(x, y)=P(x, y)|line; rasterizing operation on the original spatial data is eliminated by the AND operation of the pixel value and the result of reversing the defined constant line, for example, the line rasterizing operation on the P(x, y) pixel is eliminated, P(x, y)=P(x, y)&~line;

reading the pixel value: the value of the raster data of P(x, y) is the value of the P(x, y) pixel; and judging the pixel value: for example, the step of judging whether the rasterizing operation is performed on the pixel by the original spatial data, which is operated by the AND operation of the defined constant line and the value of the pixel. For example, a step of judging whether the rasterizing operation is performed on the P(x, y) pixel includes: judging whether the value of P(x, y)&line is larger than 0,it is determined that the P(x, y) pixel is rasterized by the line spatial entity if the value of P(x, y)&line is larger than 0, and it is determined that the P(x, y) pixel is not rasterized by the line spatial entity if the value of P(x, y)&line is 0.

The pixel operation corresponding to other spatial entity can also be performed in the above way.

In the method for simplifying spatial data disclosed by this embodiment, it is judged whether the view coordinate point conforms to the simplification condition using the pixel value, and then the corresponding view coordinate point and the original coordinate point are processed according to the result of judging. According to the method, the amount of the calculation is small, and it is ensured that the spatial relation between the simplified spatial data is correct, the amount of the data to be transmitted is decreased, and the transmission efficiency and the displaying efficiency of the data are improved.

Figure 3:
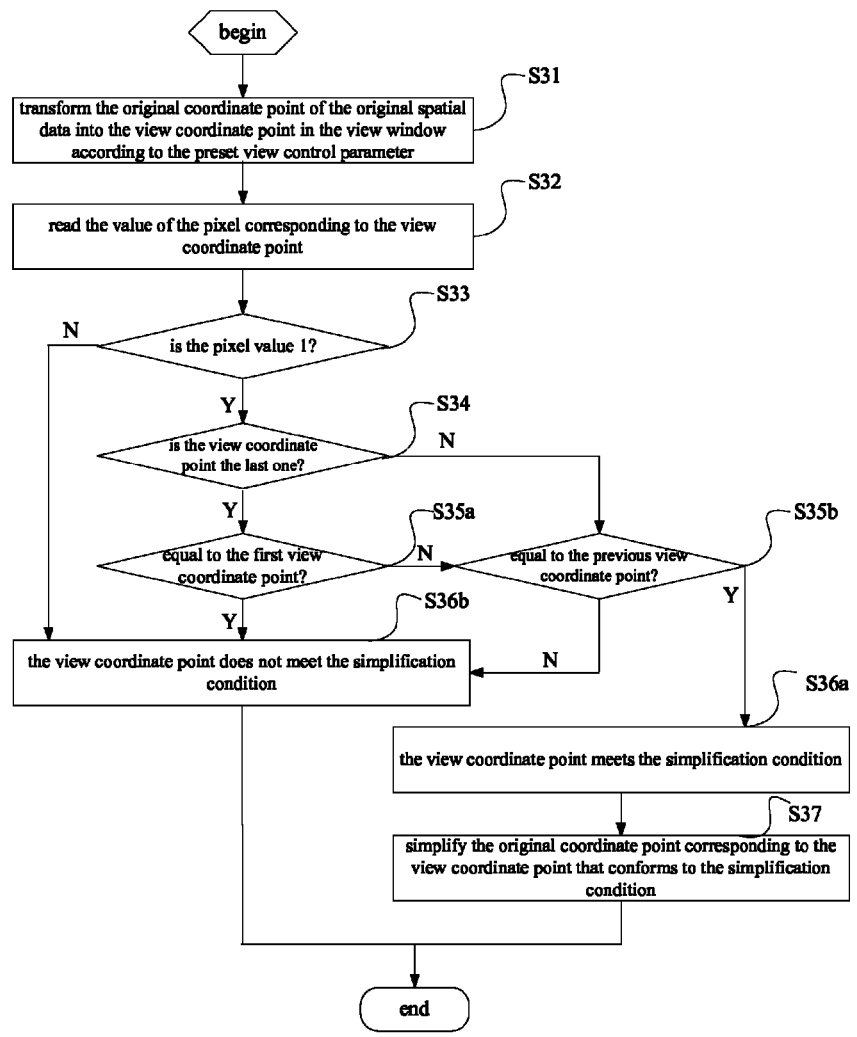
FIG. 3 is a flow chart of another method for simplifying spatial data disclosed by an embodiment of the present invention.

The flow chart of another method for simplifying spatial data disclosed by the present invention is shown in FIG. 3, and this method is applied to the case that the first original coordinate point of the spatial data is the last original coordinate point of the spatial data, for example, the line spatial data of which the end and the head are connected. The method includes the follow steps specifically.

Step S31: Transforming an original coordinate of original spatial data into a view coordinate in a view window according to a preset view control parameter, an original coordinate point of the original spatial data being corresponding to a view coordinate point in a coordinate system of the view window.

Step S32: Reading the value of the pixel corresponding to the view coordinate point.

Step S33: Judging whether the value of the pixel is 1, performing a step S34 if yes, else performing a step S36b.

Step S34: Judging whether the original coordinate point corresponding to the view coordinate point is the last original coordinate point of the original spatial data, performing a step 35a if yes, else performing a step S35b.

Step S35a: Judging whether the original coordinate point corresponding to the view coordinate point is the first original coordinate point of the original spatial data, performing the step S36b if yes, else performing the step S35b.

In this step, it is judged whether the original coordinate point corresponding to the view coordinate point to be processed currently is superposed with the first original coordinate point of the spatial data, this point can not be simplified if yes, and the following judgment needs to be performed if not.

Step S35b: judging whether the view coordinate point is a view coordinate point corresponding to an original coordinate point that is previous to the original coordinate point, performing a step 36a if yes, else performing the step 36b.

Step S36a: the view coordinate point conforms to the simplification condition

Step S36b: the view coordinate point does not conform to the simplification condition In the case that the view coordinate point does not conform to the simplification condition and the value of the pixel corresponding to the view coordinate point is 0, 1 is assigned to the pixel to indicate that a coordinate point corresponding to the pixel does not conform to the simplification condition and this view coordinate point is remained, so as to identify the original spatial data corresponding to the original coordinate point as the remained data.

Step S37: simplifying the original coordinate point corresponding to the view coordinate point that conforms to the simplification condition, according to the result of analyzing.

After this step, the method can further include the cycle step described in the above embodiment.

The method in this embodiment is not limited that the spatial data of which the first original coordinate point and the last original coordinate point are the same is processed according to the above method. The other method can be applied, in which a certain coordinate point of the spatial data, such as the last coordinate point or a key coordinate point that keeps the topology relation in the spatial data, can be taken as a special point which is remained directly rather than simplified, and only the remain coordinate points are simplified according to the above flow chart shown in FIG. 2.

Figure 4:
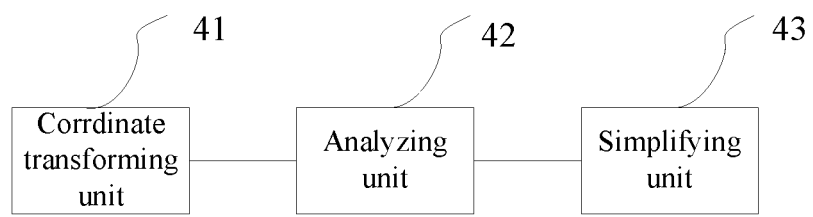
FIG. 4 is a schematic structural diagram of a device for simplifying spatial data disclosed by an embodiment of the present invention.

The present invention further discloses a device for simplifying spatial data, the structure of which is shown in FIG. 4. The device includes a coordinate transforming unit 41, an analyzing unit 42 and a simplifying unit 43. The coordinate transforming unit 41 is adapted for transforming an original coordinate of original spatial data into a view coordinate in a view window according to a preset view control parameter, in which an original coordinate point of the original spatial data is corresponding to a view coordinate point in a coordinate system of the view window. The analyzing unit 42 is adapted for analyzing whether the view coordinate point conforms to a simplification condition in the view window. The simplifying unit 43 is adapted for simplifying the original coordinate point corresponding to the view coordinate point that conforms to the simplification condition, according to the result of analyzing.

The working processes of individual units are described as follows.

The coordinate transforming unit transforms the original coordinate point of the original spatial data into the two-dimensional view coordinate point in the view window represented by the related parameter based on the related parameter of the view window represented by the currently used data structure, in which the related parameter includes the view mode and the parameter of the bounding rectangle of the view window, and in the case of the two-dimensional mode further includes the rectangular range for the queried spatial entity and the amplification ratio of the spatial entity in the view; and transforms the original coordinate point of the three-dimensional spatial data into view coordinate point in the view window represented by the related parameter, in which the related parameter includes the view mode and the parameter of the bounding rectangle of the view window, and in the case of the three-dimensional mode further includes the viewpoint parameter and the projection parameter, the viewpoint parameter includes the position of the viewpoint in the world coordinate system, the position of the object viewed by the viewpoint and the upward vector of a virtual camera, and the projection parameter includes an orthogonal projection and a perspective projection. The analyzing unit is used to analyze the view coordinate point in the view window, judge whether the view coordinate point conforms to the simplification condition, and transmit the result of e analyzing to the simplifying unit. The simplifying unit is used to determine, according to the result of analyzing, that the original data corresponding to the view coordinate point can be simplified, and simplify the original data that can be simplified and remain the original data that can not be simplified, so as to ensure that the lossless display can be performed for the simplified original spatial data in the actual view window, and meanwhile the amount of the data to be transmitted is reduced.

The processes of operating the device for processing data disclosed by this embodiment correspond to the flows of the method embodiment disclosed by the above embodiment of the present invention, which is a preferred device embodiment. The specific processes of the device refer to the above method embodiment, which will not be described in detail here.

The device for processing data disclosed by the present invention can be provided in a computer, and can also be provided in a mobile phone or other devices in which the present invention can be applied, or can be provided in other intelligent device. The device can be provided at the server, in which case the spatial data is processed before the data request by the client is sent; the device can also be provided at the client, in which case the data is processed before being sent to the actual view window; or the device can be provided at the server and the client both, in which case either or both of the server and the client is selected for performing the process according to the practical situation.

In the present specification, the embodiments are described in progression, each embodiment mainly focuses on the difference aspect from other embodiments, and reference can be made to these similar parts among the embodiments. For the device disclosed by the embodiment, it corresponds to the method disclosed by the embodiment, and thus the description of the device is relatively simple, and the reference can be made to the method description for the related portion.

Those skilled in the art can further understand that the individual exemplary units and arithmetic steps that are described in conjunction with the embodiment disclosed herein are able to be implemented in the electronic hardware, the computer software or a combination thereof For describing the interchangeability between the hardware and the software clearly, the components and the steps of individual example have been described according to the function generally in the above description. Whether these functions are implemented in hardware or software is determined by the technical solution-specific application and the design constraint condition. For each specific application, the described function can be implemented by those skilled in the art using different method, but this application should not be considered as beyond the scope of the present invention.

The steps of the method or the algorithm that are described in conjunction with the embodiment disclosed herein can be implemented in the hardware, the software module performed by the processor or the combination thereof The software module can be built in the Random Access Memory (RAM), the memory, the Read-Only Memory (ROM), the electrically programmable ROM, the electrically erasable programmable ROM, the register, the hardware, the movable disc, the CD-ROM, or any other forms of storage medium that is well-known in the technical field.

The above descriptions of the disclosed embodiments enable those skilled in the art to implement or use the present disclosure. Various modifications made to those embodiments will be obvious to those skilled in the art, and the ordinal principles defined in the present disclosure can be implemented in other embodiments without departing from the spirit or the scope of the present disclosure. Therefore, the present invention should not be limited to those embodiments disclosed herein, but should be in coincidence with the widest scope in accordance with the principles and the novel characteristics disclosed by the present invention.

What is claimed is:

1. A method for simplifying spatial data, comprising:
transforming original coordinates of original spatial data into view coordinates in a view window according to a preset view control parameter, wherein an original coordinate point of the original spatial data corresponds to a view coordinate point in a coordinate system of the view window;
determining whether there are view coordinate points corresponding to a same pixel in the view window determined according to the preset view control parameter;
if there are view coordinate points corresponding to a same pixel in the view window, determining whether no other pixel is to be plotted between two view coordinate points among the view coordinate points corresponding to the same pixel; and
if no other pixel is to be plotted between the two coordinate points, simplifying the original coordinate points corresponding to the two view coordinate points, comprising removing one of original coordinate points corresponding to the two view coordinate points.

2. The method according to claim 1, wherein the view window is represented using a data structure according to the view control parameter, and the step of representing the view window using a data structure according to the view control parameter comprises representing a pixel of the view window using a raster data structure according to the view control parameter, and wherein the pixel is a uniform grid unit into which the plane of the view window is divided, the pixel is a basic information storage unit in the raster data, a coordinate of the pixel is determined according to a corresponding line number and column number of the pixel in the view window, and the initial value of each raster data representing the pixel is set as 0.

3. The method according to claim 1, wherein determining whether there are view coordinate points corresponding to a same pixel in the view window comprises:
reading the value of the pixel corresponding to the view coordinate point in the view window; and
judging whether the value of the pixel is 1, the view coordinate point does not conform to the simplification condition in the case that the pixel value is 0; judging whether the view coordinate point is equal to a view coordinate point corresponding to an original coordinate point that is previous to the original coordinate point in the case that the pixel value is 1, the view coordinate point conforms to the simplification condition if the view coordinate point is equal to the view coordinate point corresponding to the original coordinate point that is previous to the original coordinate point, else the view coordinate point does not conform to the simplification condition.

4. The method according to claim 1, wherein determining whether there are view coordinate points corresponding to a same pixel in the view window comprises:
reading the value of the pixel corresponding to the view coordinate point in the view window; and
judging whether the value of the pixel is 1, the view coordinate point does not conform to the simplification condition in the case that the pixel value is 0; judging whether the original coordinate point corresponding to the view coordinate point is the last original coordinate point of the original spatial data in the case that the pixel value is 1; judging whether the original coordinate point corresponding to the view coordinate point is equal to the first original coordinate point of the original spatial data if the original coordinate point corresponding to the view coordinate point is the last original coordinate point of the original spatial data, the view coordinate point does not conform to the simplification condition if the original coordinate point corresponding to the view coordinate point is equal to the first original coordinate point of the original spatial data, judging whether the view coordinate point is equal to a view coordinate point corresponding to an original view coordinate point that is previous to the original coordinate point if the original coordinate point corresponding to the view coordinate point is not the last original coordinate point of the original spatial data or is not equal to the first original coordinate point of the original spatial data, the view coordinate point conforms to the simplification condition if the view coordinate point is equal to the view coordinate point corresponding to the original coordinate point that is previous to the original coordinate point, and the view coordinate point does not conform to the simplification condition if the view coordinate point is not equal to the view coordinate point corresponding to the original coordinate point that is previous to the original coordinate point.

5. The method according to claim 1, further comprising:
judging whether the original coordinate point corresponding to the view coordinate point is the last original coordinate point, selecting a next original coordinate point and returning to the step of transforming an original coordinate of original spatial data into a view coordinate in a view window according to a preset view control parameter if not, and else ending the process.

6. The method according to claim 3, further comprising:
assigning 1 to the pixel, when the view coordinate point does not conform to the simplification condition and the value of the pixel corresponding to the view coordinate point is 0.

7. The method according to claim 5, wherein the view control parameter comprises a view mode and a parameter of the bounding rectangle of the view window, wherein the view mode comprises a two-dimensional mode and a three-dimensional mode, and the parameter of the bounding rectangle of the view window comprises the width of the bounding rectangle of the view window and the height of the bounding rectangle of the view window;
in the case of the two-dimensional mode, the view control parameter further comprises a rectangular range of the queried spatial entity and an amplification ratio in which the spatial entity is displayed in the view window; and
in the case of the three-dimensional mode, the view control parameter further comprises a viewpoint parameter and a projection parameter, the viewpoint parameter comprises a position of the viewpoint in the world coordinate system, a position of an object viewed by the viewpoint and a upward vector of a virtual camera, and the projection parameter comprises an orthogonal projection and a perspective projection.

8. The method according to claim 7, wherein the amplification ratio of the spatial entity is determined by the following steps:
acquiring the ratio between the width of the bounding rectangle of the view window and the width of the rectangular range of the queried spatial entity in the view control parameter and the ratio between the height of the bounding rectangle of the view window and the height of the rectangular range of the queried spatial entity in the view control parameter; and determining the smaller one of the two ratios as the amplification ratio of the spatial entity displayed in the view window.

9. A device for simplifying spatial data, comprising a coordinate transforming unit for transforming an original coordinate of original spatial data into a view coordinate in a view window according to a preset view control parameter, wherein an original coordinate point of the original spatial data is corresponding to a view coordinate point in a coordinate system of the view window;

determining whether there are view coordinate points corresponding to a same pixel in the view window, and for determining, in the case that there are view coordinate points corresponding to a same pixel, whether no other pixel will be plotted between two view coordinate points among the coordinate points corresponding to the same pixel; and a simplifying unit for, if no other pixel is to be plotted between the two coordinate points, simplifying the original coordinate points corresponding to the two view coordinate points, comprising removing one of original coordinate points corresponding to the two view coordinate points.

* * * * *